United States Patent Office 2,945,035
Patented July 12, 1960

2,945,035

PREPARATION OF MELAMINE

William R. Rolingson, Texas City, Tex., assignor to Monsanto Chemical Company, St. Louis, Mo., a corporation of Delaware No Drawing. Filed July 21, 1958, Ser. No. 749,636

4 Claims. (Cl. 260—249.7)

The present invention relates to a novel method for the preparation of melamine.

It has now been discovered that melamine may be produced by the reaction of hydrogen cyanide and nitric oxide. According to the invention, hydrogen cyanide and nitric oxide are contacted at a temperature within the range from about 400° C. to 800° C. with a palladium catalyst and melamine is recovered from the reaction product. The following examples illustrate the invention but are not to be construed as limiting it in any manner whatsoever.

*Example 1*

A quartz tube about 30 in. long and approximately 1 in. in diameter was employed as a reactor. A bed of a catalyst consisting of 5.0 wt. percent palladium deposited upon activated alumina about 4 in. in depth was supported within the reactor on a circular porous quartz plate located about the midpoint of the tube. The reactor was heated by means of resistance wire wrapping covered by the necessary insulation. Temperatures in the tube and catalyst bed were recorded by means of a sliding iron-constantan thermocouple inserted in a quartz thermowell which extended through the catalyst bed.

The gaseous reactants, hydrogen cyanide and nitric oxide, were fed through flowmeters at rates of approximately 1.0 and 0.3 mole per hour, respectively, mixed in a glass manifold, and then passed into the reactor and through the catalyst bed which was heated to a temperature of about 750° C. to 800° C. Pressure in the reactor was maintained at essentially atmospheric. The ratio of HCN to nitric oxide employed was 3:1. The reaction was continued for about one hour at this temperature. The crystalline product deposited in the cooler part of the reaction tube was collected and positively identified as melamine by means of its melting point which was determined to be 348° C. with some sublimation occurring.

*Example 2*

The experiment in Example 1 was repeated over a reaction period of several hours and with the catalyst bed maintained at a temperature of about 450° C. The crystalline product deposited in the cooler part of the tube was collected, extracted with hot water, and the melamine present was precipitated from the solution with picric acid. The picrate derivative melted with decomposition at a temperature of 310° C. to 312° C. as compared to a known sample of melamine picrate which melted with decomposition at 315° C. to 316° C.

*Example 3*

The experiment in Example 1 was again repeated over a reaction period of 1.5 hours but with the temperature of the catalyst bed maintained at from about 500° C. to about 600° C. The identity of the crystalline melamine product in this instance was established by means of its infrared spectra.

The invention is not to be construed as limited to the specific conditions set forth in the examples since substantial variation in conditions may be made without departing from the scope of the invention. For example, any temperatures within the range 400° C. to 800° C. may be used. Preferably, the temperature of the catalyst bed is maintained from 450° C. to 600° C.

While equimolar quantities of HCN and nitric oxide may be employed, it is preferred to use the HCN in excess. The ratio of HCN to nitric oxide may vary from 1:1 to 20:1, but preferably is maintained within the range from 2:1 to 5:1.

Although the preferred catalyst is palladium supported on activated alumina as exemplified, the metal may be used per se or other carriers may be employed. Any of the common catalyst supports characterized by high surface area are suitable. In addition to alumina, there may be used, for example, charcoal, silica gel, fuller's earth, kaolin, and the like.

Either a batch or continuous process is feasible. The product melamine may be recovered from the reaction product by recrystallization, sublimation, or other known techniques.

What is claimed is:

1. The process for preparing melamine which comprises heating together hydrogen cyanide and nitric oxide at a temperature in the range from 400° C. to 800° C. in contact with a palladium catalyst.

2. The process for preparing melamine which comprises heating together hydrogen cyanide and nitric oxide at a temperature in the range from 400° C. to 800° C. in contact with a supported palladium catalyst.

3. The process for preparing melamine which comprises heating together hydrogen cyanide and nitric oxide in a molecular ratio in the range from 1:1 to 20:1 at a temperature in the range from 400° C. to 800° C. in contact with a catalyst comprising palladium supported upon alumina.

4. A method for the preparation of melamine which comprises heating together hydrogen cyanide and nitric oxide in molecular ratio of 3:1 at a temperature in the range from 400° C. to 800° C. in contact with a catalyst comprising palladium supported upon alumina.

References Cited in the file of this patent

UNITED STATES PATENTS 2,615,018    Lane ------------------ Oct. 21, 1952

FOREIGN PATENTS 119,682    Australia -------------- Apr. 17, 1945